US010663952B2

United States Patent
Niedrist et al.

(10) Patent No.: US 10,663,952 B2
(45) Date of Patent: May 26, 2020

(54) METHOD AND COMPUTER SYSTEM TO CONSISTENTLY CONTROL A SET OF ACTUATORS

(71) Applicant: TTTech Computertechnik AG, Vienna (AT)

(72) Inventors: Georg Niedrist, Guntramsdorf (AT); Eric Schmidt, Grosskrut (AT); Stefan Traxler, Vienna (AT); Wilfried Steiner, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 0 days.

(21) Appl. No.: 16/186,909

(22) Filed: Nov. 12, 2018

(65) Prior Publication Data
US 2019/0146461 A1    May 16, 2019

(30) Foreign Application Priority Data

Nov. 14, 2017  (EP) .................................... 17201657

(51) Int. Cl.
*G05B 19/4155*    (2006.01)
*G05B 9/03*    (2006.01)
(Continued)

(52) U.S. Cl.
CPC ........... *G05B 19/4155* (2013.01); *G05B 9/03* (2013.01); *G05B 2219/24175* (2013.01);
(Continued)

(58) Field of Classification Search
CPC ...... G05B 19/4155; G05B 2219/24175; G05B 2219/2637; G05B 2219/31168;
(Continued)

(56) References Cited

U.S. PATENT DOCUMENTS 8,780,699 B1 * 7/2014 Hasan ....................... H04L 1/22
370/219
2004/0117037 A1 * 6/2004 Hinshaw ................ G06F 16/273
700/2

(Continued)

OTHER PUBLICATIONS

European Search Report of European Application No. 17201657.8 dated Apr. 25, 2018.

*Primary Examiner* — Mewale A Ambaye
(74) *Attorney, Agent, or Firm* — Eversheds Sutherland (US) LLP

(57) ABSTRACT

A method for transmitting control commands in a computer system, which includes components at least in the form of nodes, actuators and communication systems, wherein the control commands are communicated over the communication systems from the nodes to the actuators, and wherein one or more of the components may fail to operate according their specification. For consistently accepting control commands at the actuators, the nodes and their control commands are assigned priorities, wherein a node and its control commands have the same priority, wherein at least two priorities are used, wherein a high priority node produces high priority control commands and a low priority node produces low priority control commands, and wherein a high priority node is configured to communicate its control commands over at least two communication systems to the actuators and a low priority node is configured to communicate its low priority control commands over at least one communication system to the actuators. An actuator accepts the high priority control commands from the high priority node as long as it receives said high priority control commands on any one of the communication systems, and in this first case, it discards the low priority control commands, and stops to accept said high priority control commands in case said actuator does not receive said high priority control (Continued)

commands from any of the communication systems for a configurable duration, and in the second case, the actuator starts to accept low priority control commands.

9 Claims, 10 Drawing Sheets

(51) Int. Cl.
 *H04L 12/40* (2006.01)
 *H04L 12/24* (2006.01)
 *H04L 29/08* (2006.01)

(52) U.S. Cl.
 CPC ............... *G05B 2219/2637* (2013.01); *G05B 2219/31168* (2013.01); *H04L 12/40176* (2013.01); *H04L 41/0663* (2013.01); *H04L 67/12* (2013.01)

(58) Field of Classification Search
 CPC ..... G05B 9/03; H04L 12/40176; H04L 67/12; H04L 41/0663
 See application file for complete search history.

(56) References Cited

U.S. PATENT DOCUMENTS

| | | |
|---|---|---|
| 2007/0028123 A1* | 2/2007 | Lindley ................. G06F 9/4416 713/300 |
| 2008/0046142 A1 | 2/2008 | Jordan et al. |
| 2012/0265359 A1 | 10/2012 | Das et al. |
| 2013/0131837 A1 | 5/2013 | Washington et al. |
| 2015/0381407 A1* | 12/2015 | Wang .................. H04L 41/0663 370/221 |
| 2016/0043549 A1* | 2/2016 | Beauregard ............ G05B 13/04 700/286 |
| 2016/0094436 A1 | 3/2016 | Elder et al. |
| 2018/0212792 A1* | 7/2018 | Brandt ................ H04L 65/1033 |

\* cited by examiner

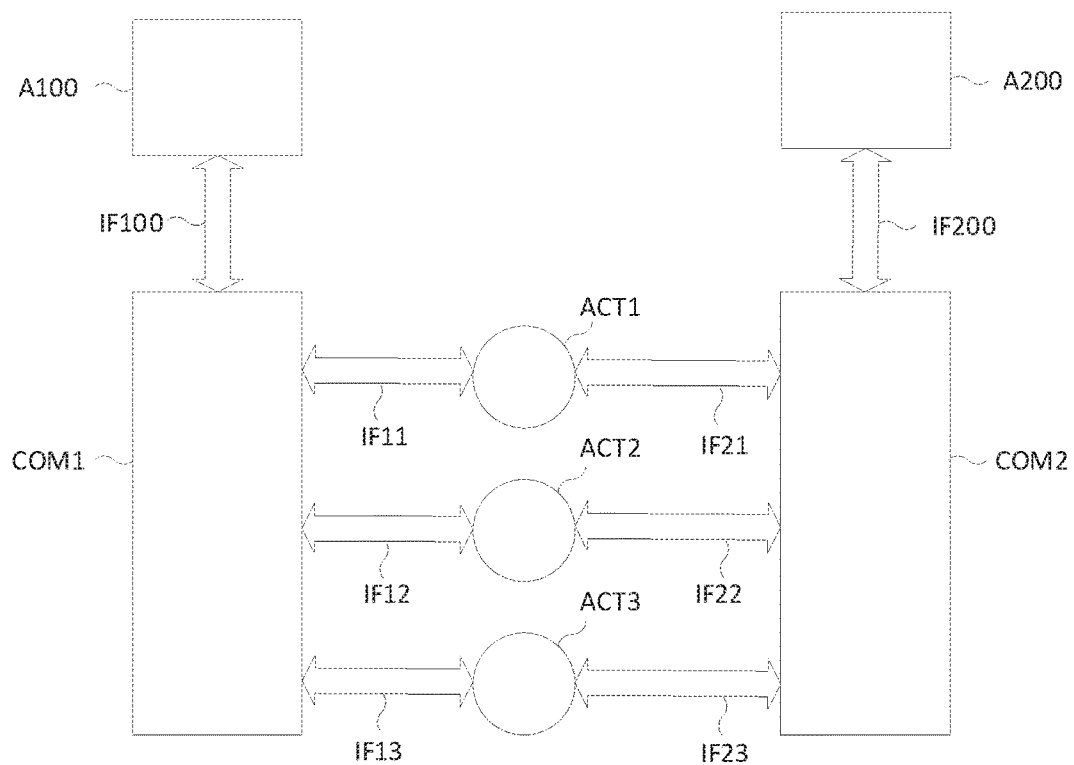
Fig. 1 (state-of-the-art)
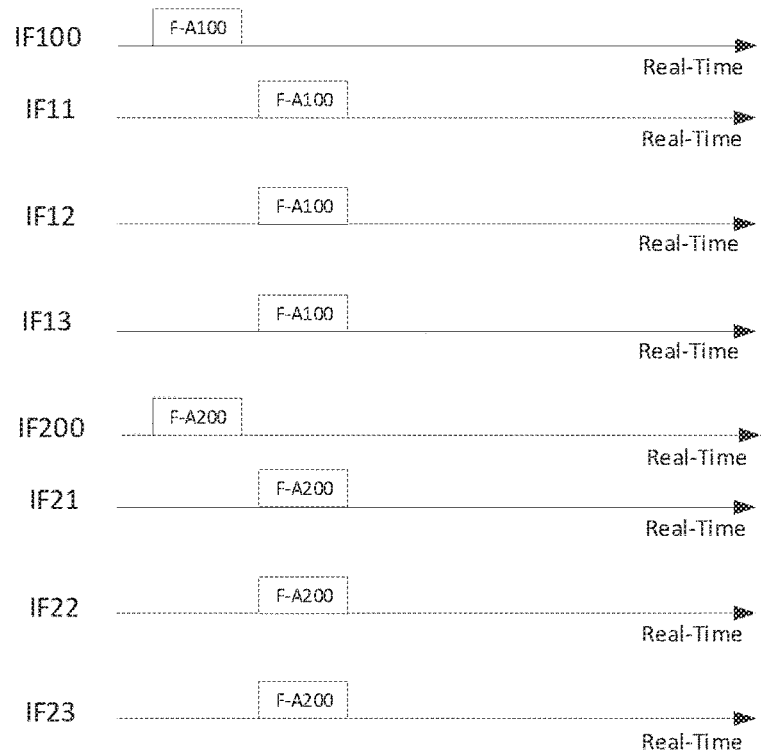
Fig. 2 (state-of-the-art)

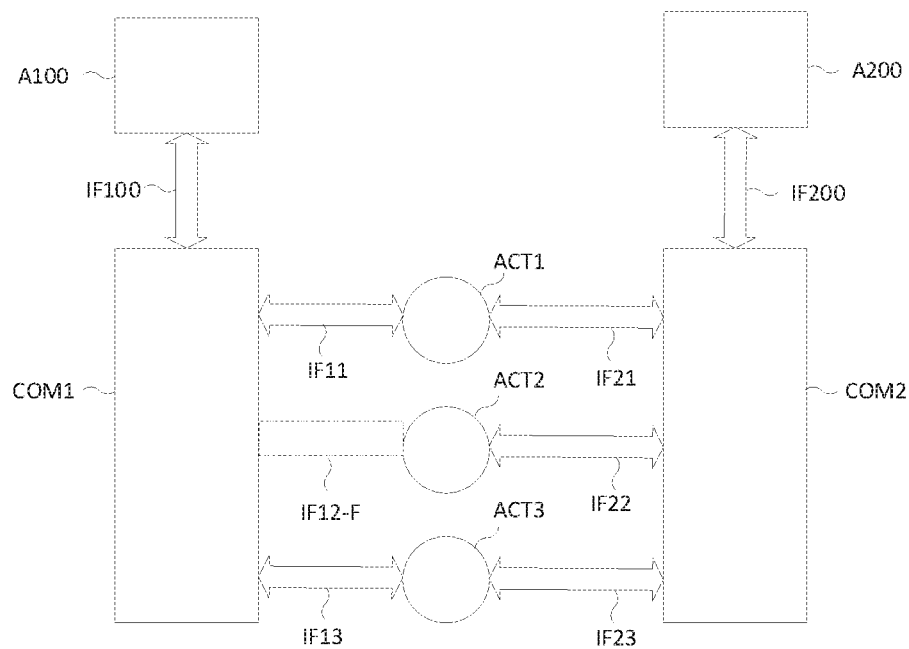
Fig. 3 (state-of-the-art)
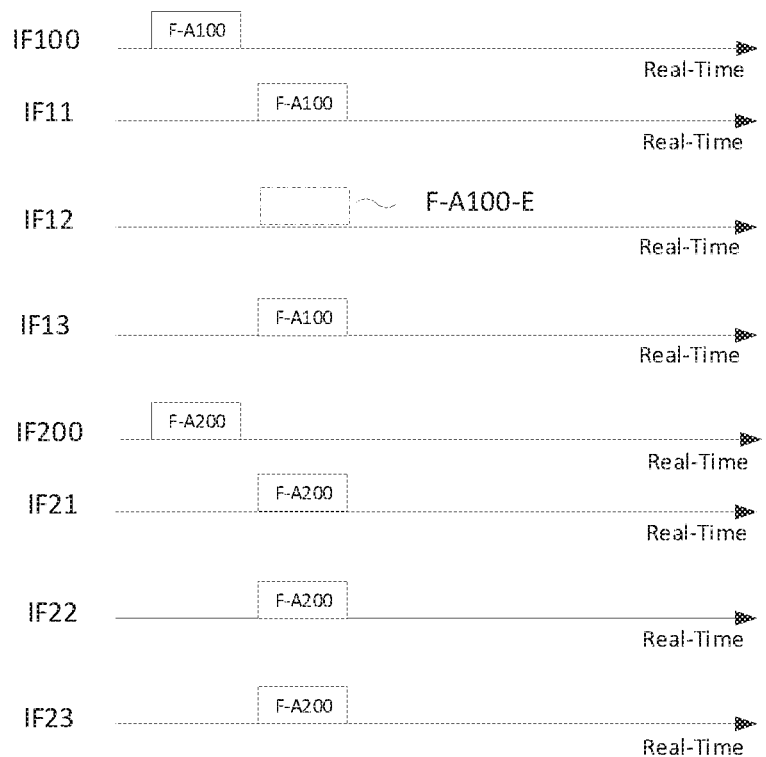
Fig. 4 (state-of-the-art)

METHOD AND COMPUTER SYSTEM TO CONSISTENTLY CONTROL A SET OF ACTUATORS

CROSS-REFERENCE TO RELATED APPLICATIONS

This application claims priority to European Patent Application No. 17201657.8, filed Nov. 14, 2017, which is incorporated herein by reference.

DESCRIPTION

The invention relates to a method for transmitting control commands in a computer system, wherein said computer system comprises components at least in form of nodes, actuators and communication systems, wherein said control commands are communicated over said communication systems from said nodes to said actuators, and wherein one, two, or more components of the computer system may fail to operate according their specification. The invention relates to a method to consistently accept control commands from nodes at actuators, which control commands are communicated over communication systems and where one, two, or more components of the computer system may fail to operate according their specification.

Furthermore the invention relates to a fail-over device that is connected to a high priority node and to a low priority node, and the fail-over device is able to enable and disable the communication from the low priority node to a communication system.

Finally, the invention relates to a fault-tolerant computer system comprising nodes and actuators where nodes communicate over communication systems with said actuators and wherein one, two, or more components may fail to operate according their specification.

The invention relates to the consistent control of a set of actuators in a vehicle. Such a vehicle can be for example an automobile, an aircraft, a spacecraft, or a mobile robot. Said actuators are controlled by means of control commands as produced by computing nodes (for short "nodes") of a computing system in the vehicle. The control commands are delivered from the nodes to the actuators in the vehicle by means of one, two, or a multitude of communication systems.

A vehicle is designed to tolerate the failure of one, two, or many components of a computer system. The generic term "component" denotes nodes, communication systems (or part of a communication system), actuators, and links connecting nodes or actuators with communication systems. This invention ensures that even in the event of a failure of any one component a set of non-faulty actuators in the vehicle accept control commands from nodes consistently. Consistently means in the context of this application that if one non-faulty actuator uses the control command from one node of potentially many nodes, then all other non-faulty actuators of a known set of actuators (possibly all non-faulty actuators in the vehicle) will accept the control commands of said one node, too. The phrase "to accept a control command" means in the context of this application that an actuator will use said control command to cause a physical effect on the vehicle. Examples for such physical effects are acceleration and deacceleration of the vehicle as well as any modification of the direction of the movement of the vehicle. While the primary purpose of the invention is to tolerate a single faulty component the invention is also capable to tolerate various scenarios in which more than one failures are present.

It is critical for the safe operation of a vehicle, that non-faulty actuators consistently accept control commands. If non-faulty actuators were to not consistently accept the control commands, then there is a risk that different control commands are provided by different nodes and different actuators will react to different control commands.

For example in one scenario one node may send a control command instructing the actuators to fully halt the vehicle, while a second node may send a control command instructing the actuators to move the vehicle along an emergency trajectory. In this case, consistent acceptance would be either one of the following two cases:

a) all non-faulty actuators accept the control command from said first node and discard the control commands from said second node, or b) all non-faulty actuators accept the control command from said second node and discard the control commands from said first node.

If in this example the non-faulty actuators were to not consistently accept the control commands, then some of the actuators might attempt to bring the vehicle to a halting position, while other actuators might attempt to move the vehicle along the emergency trajectory. In this case, the vehicle may enter an unsafe state that might lead to an incident like the crash of the vehicle.

It is an objective of the invention to enable a set of actuators to consistently accept control commands with minimal coordination overhead of the actuators between themselves. In particular, the state-of-the-art for these type of problems requires the actuators to execute a so called "agreement protocol". Such an agreement protocol would instruct the actuators to exchange information between each other on which control commands they received. This exchange of information and the original control commands received enables all non-faulty actuators to conclude on which control command to use consistently (where consistently follows the definition presented earlier in this application).

It is the objective of the invention to significantly reduce said exchange of information between the actuators and in some realizations to even remove said exchange of information between the actuators entirely.

This object is achieved with a method described above wherein for consistently accepting control commands at said actuators nodes and their control commands are assigned priorities, wherein a node and its control commands have the same priority, wherein at least two priorities are used, wherein a high priority node produces high priority control commands and a low priority node produces low priority control commands, and wherein a high priority node is configured to communicate its control commands over at least two communication systems to the actuators and a low priority node is configured to communicate its low priority control commands over at least one communication system to the actuators, and wherein an actuator accepts the high priority control commands from the high priority node as long as it receives said high priority control commands on any one of the at least two communication systems and in this first case discards the low priority control commands, and stops to accept said high priority control commands in case said actuator does not receive said high priority control commands from any communication system of the at least two communication systems for a configurable duration, and in which second case the actuator starts to accept low priority control commands.

The invention asserts priorities to the nodes where the same said priorities are also asserted to the respective control commands that said nodes produce. The actuators are able to interpret the priorities and are instructed according to the invention to accept control commands based on their priorities: all actuators will accept the highest priority control commands. However, if an actuator does not receive control commands with a given priority (e.g., the highest control command) for a configurable duration, then the actuator accepts the control command with the next lower priority that it receives.

In an example realization in which only two nodes are present, there are only two priorities, high and low. In this example realization, an actuator always accepts the high priority control commands as long as it receives high priority control commands and only starts to accept the low priority control command when it does not receive high priority control commands for a configured duration.

Furthermore, according to the invention at least the node with the highest priority is connected to the actuators by means of at least two communication systems and one low-priority node (where low priority means not the highest priority) is connected to the actuators by means of at least one communication system.

In one realization of the invention, a fail-over device is implemented. The fail-over device has two states ACTIVE and BACKUP. In the ACTIVE state, the fail-over device will block the communication of the control commands from the low-priority node to the actuators. In the BACKUP state, the fail-over device will enable the communication of the control commands from the low-priority node to the actuators. The fail-over device will start in the ACTIVE state and change from the ACTIVE state to the BACKUP state in case it does not receive control commands from the highest priority node for a configurable duration.

In one realization, the fail-over device is implemented as independent component.

In another realization, the fail-over device is implemented as part of the low-priority node.

In another realization, the fail-over device is implemented as part of a communication system that connects the low-priority node to the actuators.

In another realization, a fail-over device is implemented in each actuator.

As mentioned above, in advantageous embodiments of the method according to the invention one, more than one, or all of the followings features may be implemented:
  The computer system may comprise exactly two nodes which produce control commands, wherein a high priority node of said two nodes communicates on exactly two communication systems, and wherein a low priority node of said two nodes communicates on exactly one communication system.
  A fail-over device may be provided which controls whether control commands from a low priority node are forwarded on a communication system or not.
  The decision of the fail-over device, whether control commands from a low priority node are forwarded on a communication system or not, may depend on the fail-over device receiving control commands from a high priority node.
  The fail-over device may start forwarding control commands from a low priority node on a communication system when any one or any combination of the following conditions is/are met:
    the fail-over device does not receive control commands from a high priority node for a configured duration;
    the fail-over device does receive more control commands from a high priority node than it is configured to receive;
    the fail-over device receives faulty control commands from a high priority node.
  It may be provided that said configurable duration is longer than the maximum duration in between the production of two succeeding control commands.
  It may be provided that said fail-over device only forwards a configurable number of control commands per configurable time-duration it receives from a high-priority node on a communication system when it starts forwarding control commands from a low-priority node to said communication system and where said configurable number can be 0, 1, 2, or any integer number.

As mentioned before, the objective of the invention may also be achieved with a fail-over device for a computer system, wherein said fail-over device is connected to a high priority node and to a low priority node of said computer system, and which fail-over device is able to enable and disable the communication from the low priority node to a communication system of the computer system, wherein the fail-over device maintains two states, where in one of the states the fail-over device is configured not to forward control commands from said low priority node to said communication system, and wherein said fail-over device in the second state is configured to forward control commands from said low priority node to said communication system.

The fail-over device may be configured to change from said first state to said second state when any one or any combination of the following conditions is/are met:
  the fail-over device does not receive control commands from a high priority node for a configured duration
  the fail-over device does receive more control commands from a high priority node than it is configured to receive
  the fail-over device receives faulty control commands from a high priority node.

The fail-over device may be configured to only forward a configurable number per configurable time-duration of control commands it receives from a high-priority node on a communication system when it starts forwarding control commands from a low-priority node to said communication system and where said configurable number can be 0, 1, 2, or any integer number.

The objective may also be achieved with a fault-tolerant computer system comprising nodes and actuators, wherein nodes communicate over communication systems with actuators, and wherein one, two, or more components of the computer system may fail to operate according their specification, and wherein the fault-tolerant computer system comprises a fail-over device as described above.

Said fault-tolerant computer system according may comprise said fail-over device as part of a low priority node.

Said fault-tolerant computer system may comprise said fail-over device as part of a communication system, in particular as part of a communication system which at least is connected to the low priority node.

In the following, in order to further demonstrate the present invention, illustrative and non-restrictive embodiments are discussed, as shown in the drawings, which show:
  FIG. 1 an example of a fault-tolerant computer system according to the state-of-the art, FIG. 2 a communication example according to the state-of-the in a computer system shown in FIG. 1, FIG. 3 the fault-tolerant computer system of FIG. 1 with a failure present, FIG. 4 a communication example in the computer system of FIG. 3, FIG. 5 an example of a fault-tolerant computer system according to the invention, FIG. 6 a communication example in the computer system of FIG. 5, FIG. 7 an example of a fault-tolerant computer system according to the invention including a fail-over device, FIG. 8 a communication example in the computer system of FIG. 7, FIG. 9 a communication example in a computer system, FIG. 10 a communication example in a computer system, FIG. 11 another example of a fault-tolerant computer system according to the invention including a fail-over device, FIG. 12 yet another example of a fault-tolerant computer system according to the invention including a fail-over device, and FIG. 13 yet another example of a fault-tolerant computer system according to the invention.

Some of the many implementations of the invention are described below. If not stated otherwise, all details described in connection with a specific example are not only valid in connection with this example, but apply to the general scope of protection of the invention.

FIG. 1 depicts an example realization of a computer system according to the state of the art. The computer system comprises two nodes A100, A200, two communication system COM1, COM2, and actuators ACT1, ACT2, ACT3. Each node A100, A200 is connected to exactly one communication system COM1, COM2 via an interface IF100, IF200, respectively. Additionally, each communication system COM1, COM2 is connected to the actuators ACT1, ACT2, ACT3 via respective interfaces IF11, IF12, IF13, IF21, IF22, IF23.

FIG. 2 depicts an example communication of control commands F-A100, F-A200 in a computer system according to FIG. 1 from node A100 and node A200 to the actuators ACT1, ACT2, ACT3. As depicted, control command F-A100 is communicated from node A100 to the communication system COM1 via the interface IF100 and further communicated from the communication system COM1 to the actuators ACT1, ACT2, ACT3 via the respective interfaces IF11, IF12, IF13. Likewise, control command F-A200 is communicated from node A200 to the communication system COM2 via the interface IF200 and further communicated from the communication system COM2 to the actuators ACT1, ACT2, ACT3 via the respective interfaces IF21, IF22, IF23. Thus, all actuators receive control commands F-A100, F-A200 from both nodes A100, A200.

FIG. 3 depicts the computer system according to FIG. 1, wherein according to FIG. 3 a failure IF12-F occurs in the interface IF12 that connects node A100 via the communication system COM1 to the actuator ACT2. This failure IF12-F causes that control commands from node A100 are not delivered to ACT2.

FIG. 4 depicts an example communication of control commands F-A100, F-A200 in the situation as depicted in FIG. 3. As depicted in FIG. 4, the failure IF12-F in the interface IF12 causes a situation in which only two actuators ACT1, ACT3 receive the control command F-A100 from node A100, while actuator ACT2 does not receive the control command F-A100. This absence of the control command is indicated by F-A100-E. However, all actuators ACT1, ACT2, ACT3 receive the control command F-A200 from node A200. According to the state-of-the-art (see e.g. [1]), the actuators ACT1, ACT2, ACT3 need to execute an agreement protocol to decide which of the control commands F-A100, F-A200 they will accept such that they will consistently accept only control commands F-A100 or only control commands F-A200.

FIG. 5 depicts an example of the realization of a computer system according to the invention in which a node A100 as well as control commands F-A100 of node A100 are assigned priority HIGH while node A200 and the control commands F-A200 of node A200 are assigned priority LOW. Furthermore, according to the invention, node A100 is connected to communication system COM1 and in addition to communication system COM2.

In the case of no failure, the actuators ACT1, ACT2, ACT3 receive control commands F-A100 of node A100 via the communication system COM1 (and connections IF11, IF12, IF13) as well as via communication system COM2 (connection IF101 and connections IF21, IF22, IF23). The actuators ACT1, ACT2, ACT3 receive control commands F-A200 of node A200 via communication system COM2 (and connections IF21, IF22, IF23).

FIG. 6 depicts an example communication of control commands F-A100, F-A200 in the situation as depicted in FIG. 5 considering, again, interface IF12 to be faulty. As depicted actuators ACT1 and ACT3 receive control commands F-A100 from communication system COM1, while actuator ACT2 does not receive F-A100 from communication system COM1. However, since node A100 is also connected to communication system COM2 using interface IF101, the control commands F-A100 from node A100 are also communicated using said communication system COM2 to actuators ACT1, ACT2, ACT3, over the respective interfaces IF21, IF22, IF23. Furthermore, the actuators ACT1, ACT2, ACT3 receive the control commands F-A200 from node A200 on their interfaces IF21, IF22, IF23 to the communication system COM2.

According to the invention, an actuator ACT1, ACT2, ACT3 will accept the HIGH priority control command if it receives such a control command on any communication system COM1, COM2. Accordingly, according to the situation as depicted in FIG. 6 in a computer system according to FIG. 5 with a faulty connection IF12 all actuators ACT1, ACT2, ACT3 will accept F-A100, although the connection IF12 is faulty. Since all non-faulty actuators (in this case all actuators) accept the same control command F-A100, they consistently accept control commands, namely the control commands F-A100 (as per the definition of consistently accept).

In contrast to the state-of-the-art, no agreement protocol needs to be executed between the actuators ACT1, ACT2, ACT3. The only necessity is to configure the actuators ACT1, ACT2, ACT3 in such a way that they accept control commands with priority HIGH, if they obtain control commands with priority HIGH and to accept control commands with priority LOW in case they do not obtain a control command with priority HIGH.

As explained, the actuators accept the control commands with priority HIGH according to the example shown in FIG. 6. The actuators additionally receive control commands F-A200 with priority LOW. These control commands with priority LOW are discarded in the example of FIG. 6.

In another example, the node A100 may become faulty and fail to send control commands F-A100 with priority HIGH, in these cases the actuators ACT1, ACT2, ACT3 would only receive control commands F-A200 with priority LOW. In these cases, all actuators ACT1, ACT2, ACT3 would consistently accept control commands F-A200.

FIG. 7 depicts an example realization of a computer network according to the invention similar to the one depicted in FIG. 5. However, in this case an additional fail-over device S300 is introduced. The fail-over device S300 is connected to both nodes A100 via an interface IF102 and to node A200 via an interface IF200a. The fail-over device S300 starts in a state ACTIVE in which it forwards control commands F-A100 from node A100 to the communication system COM2 using interface IF200b and does not forward control commands F-A200 from node A200 to the communication system COM2. In case that the fail-over device S300 detects a failure of node A100, it will change from the ACTIVE state into a state BACKUP, in which state BACKUP it will forward control commands F-A200 as received from node A200 on interface IF200a to the communication system COM2 via the interface IF200b and may stop forwarding control commands F-A100 from node A100 to the interface IF200b. Examples of detection procedures for said detection of a failure in the fail-over device S300 can be any one or any combination of the following:

- the fail-over device S300 does not receive control commands F-A100 on its interface IF102 for a configured duration
- the fail-over device S300 does receive more control commands F-A100 on its interface than it is configured to receive
- the fail-over device S300 receives faulty control commands F-A100 on its interface IF102, where the failure of the control command could be indicated by specific values in the control command, such as faulty checksums, faulty timestamps, faulty sequence numbers and/or other failures in protection mechanisms alike.

The fail-over device S300 reduces the number of control commands that the actuators receive. This has various benefits. On one hand, the actuators need to process fewer control commands and therefore can be realized with less computational resources. On the other hand, it reduces the probability that in case of multiple failures in the system or any other race conditions the actuators fail to consistently accept control commands.

FIG. 8 depicts an example communication scenario in the example realization of FIG. 7. In this example, the fail-over device S300 is in the ACTIVE state. As depicted, the fail-over device S300 receives control commands F-A100 on its interface IF102. Therefore, it will forward control commands F-A100 on the communication system COM2, while blocking control commands F-A200 from the node A200. As all actuators receive control the command F-A100, they consistently accept said control command F-A100.

FIG. 9 depicts an example communication scenario in the example realization of FIG. 7. In this example, the fail-over device S300 entered the BACKUP state, because it did not receive the control command F-A100 for a configured duration as indicated by F-A100-E. Thus, the fail-over device S300 forwards control commands F-A200 from node A200 to communication system COM2. As depicted, all actuators receive F-A200 and consistently accept control command F-A200.

FIG. 10 depicts an example communication scenario in the example realization of FIG. 7. In this example, the fail-over device S300 enters the BACKUP state, because it did receive too many control commands F-A100 from node A100, i.e., two succeeding control commands F-A100 are received too close to each other thereby violating a minimum interarrival time MIN-INTER on the interface IF102. In the BACKUP state, it forwards only control commands from node A200 on interface IF200b and blocks all control commands F-A100 from node A100 from communication on interface IF200b (e.g., the one control command indicated by reference sign F-A100-N1). In another realization, the fail-over device S300 may be configured to forward a pre-configured number of control commands F-A100 per a configured duration also in the BACKUP state. Thus, in the latter case the fail-over device S300 would not entirely block the communication from node A100 but only reduce the communication from A100 on the interface IF200b to a configured number of control commands.

REFERENCES

Figure 5:
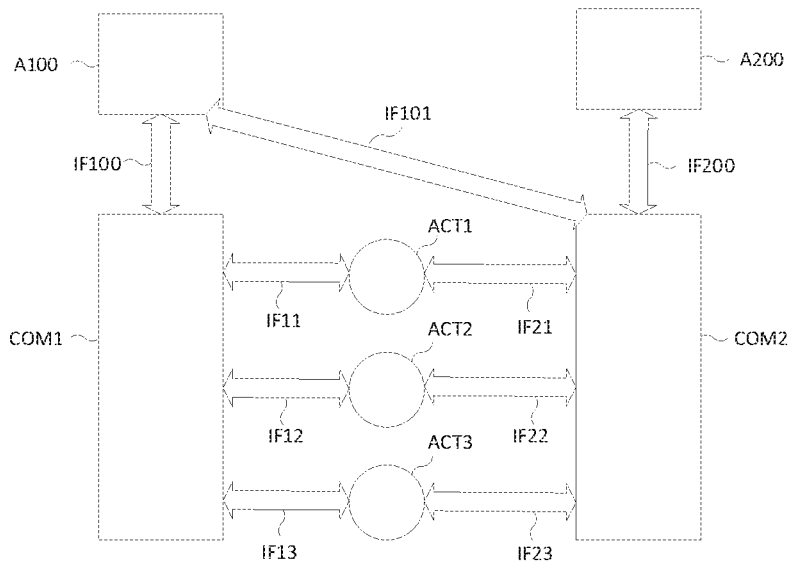
Figure 6:
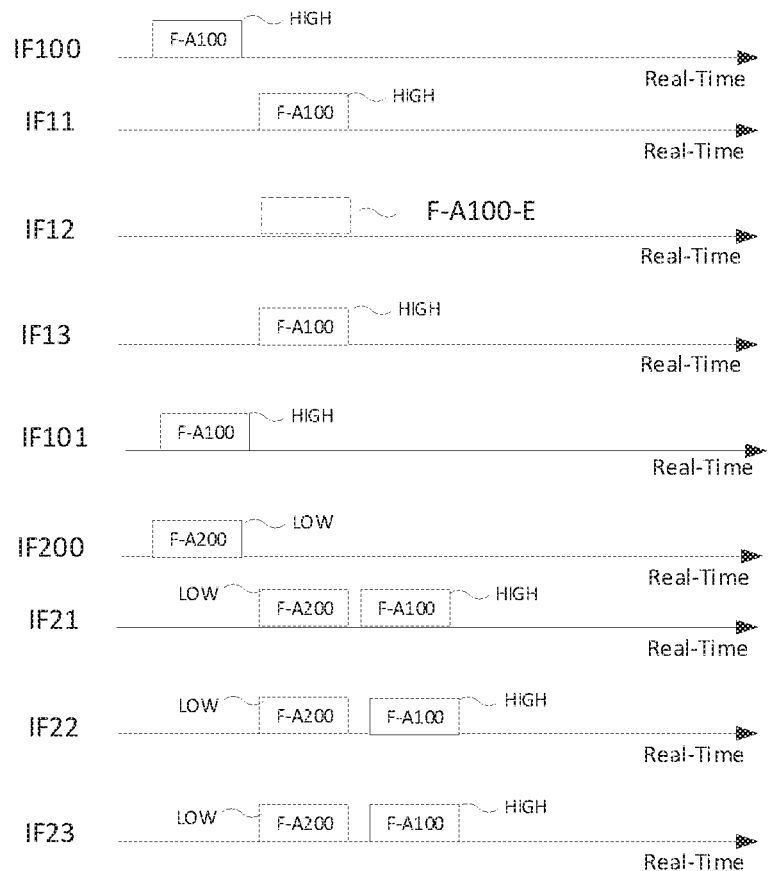
Figure 7:
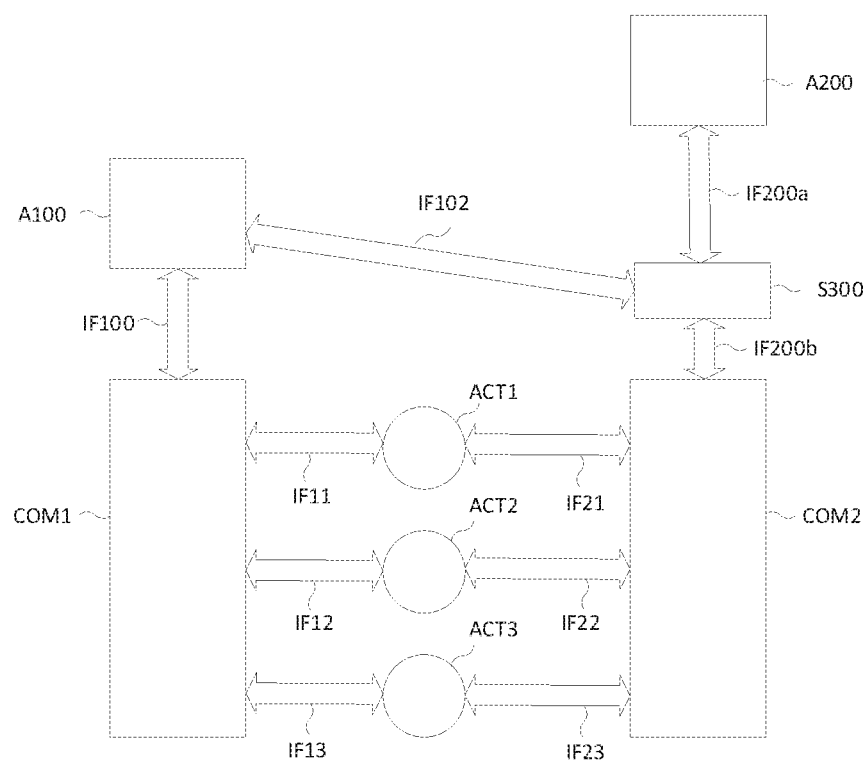
Figure 8:
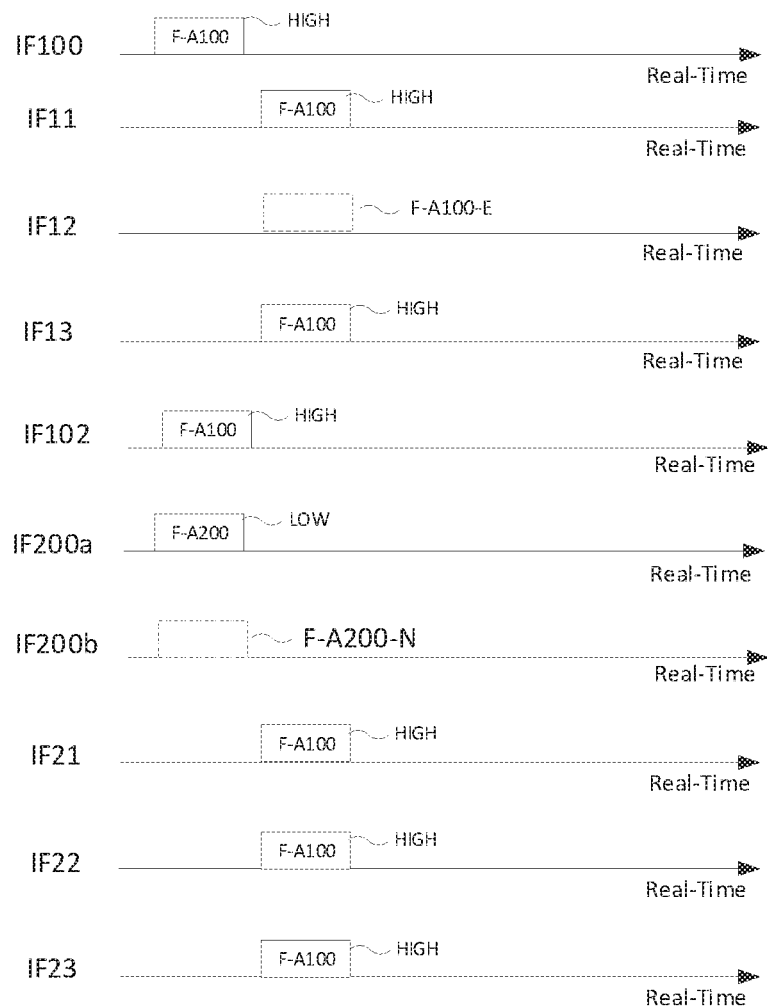
Figure 9:
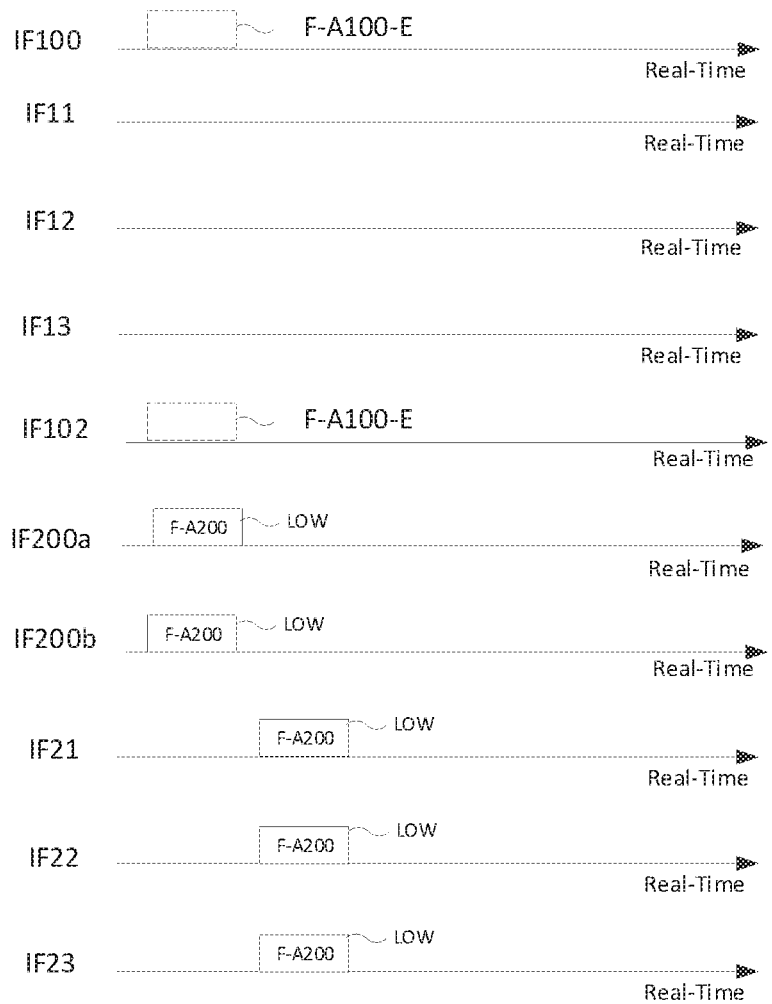
Figure 10:
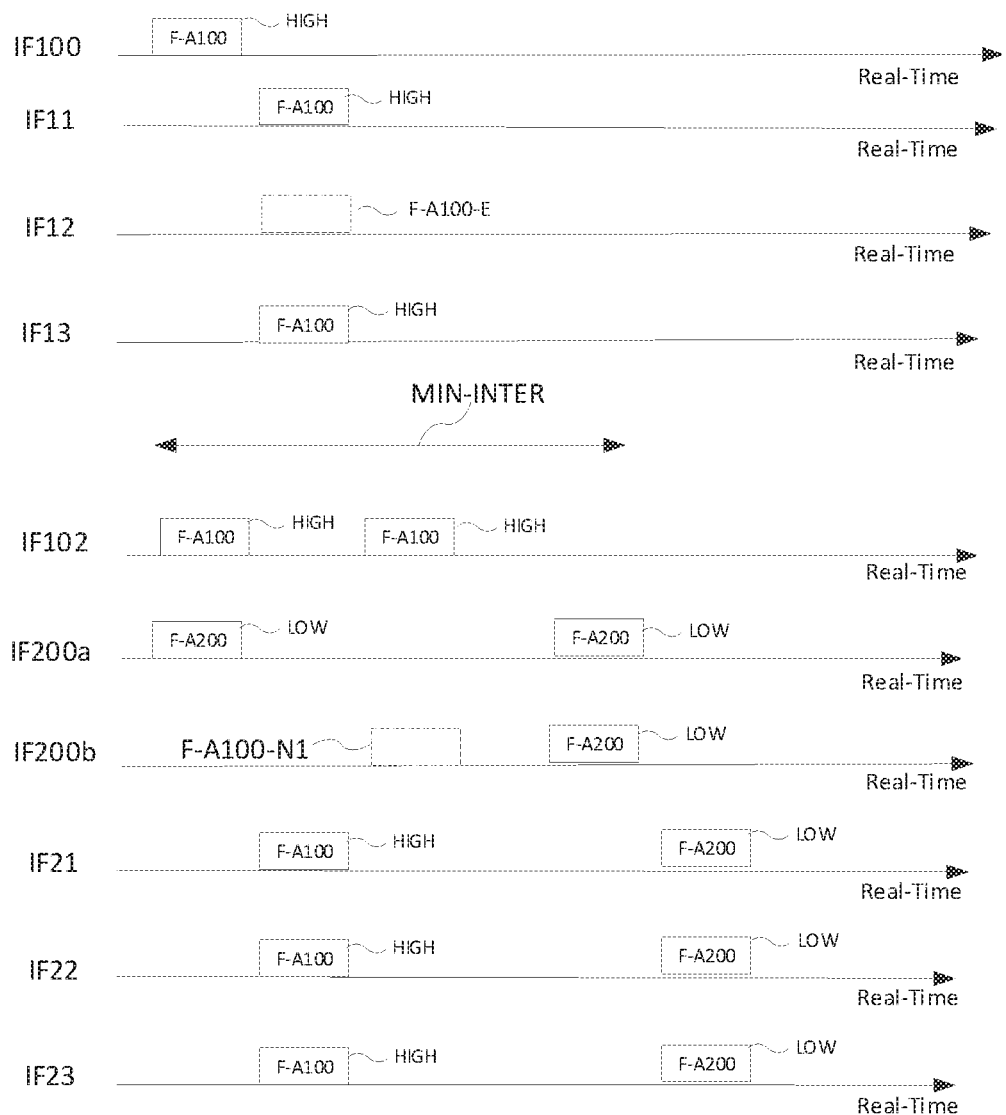
Figure 11:
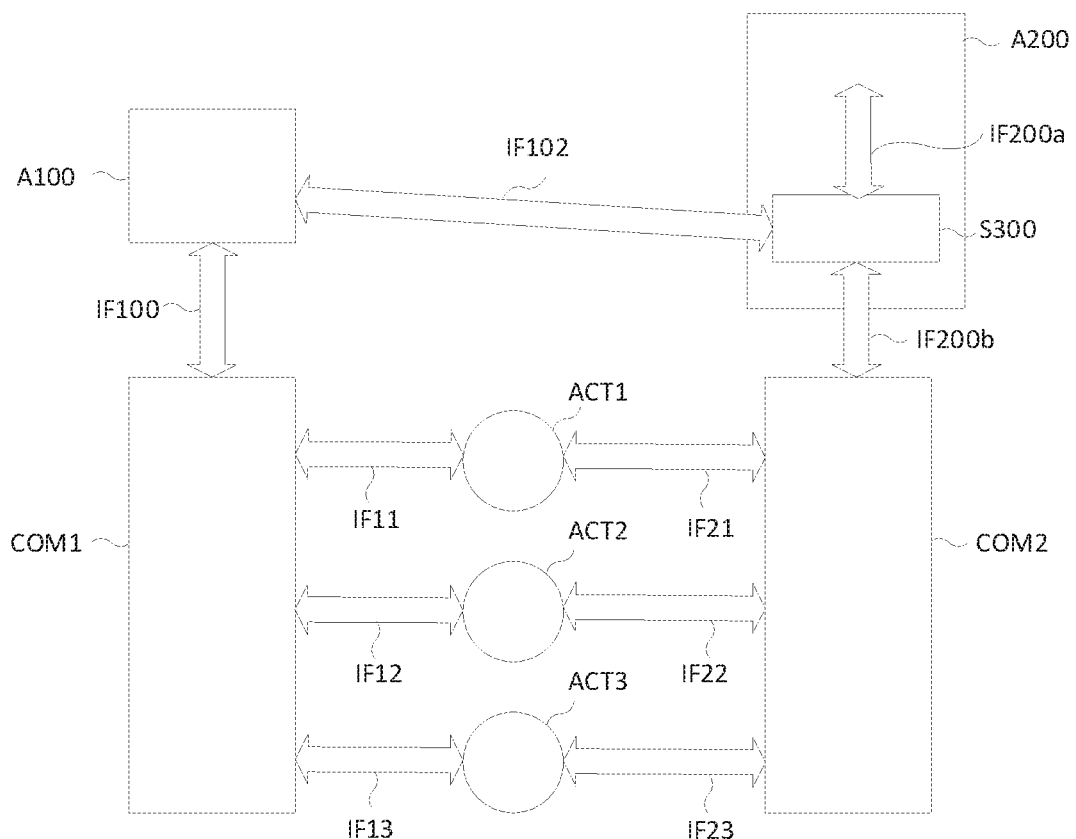
FIG. 11 depicts an example realization of the invention. In this case, the fail-over device S300 is part of the node A200 and the interface IF200a is an internal interface in node A200.
Figure 12:
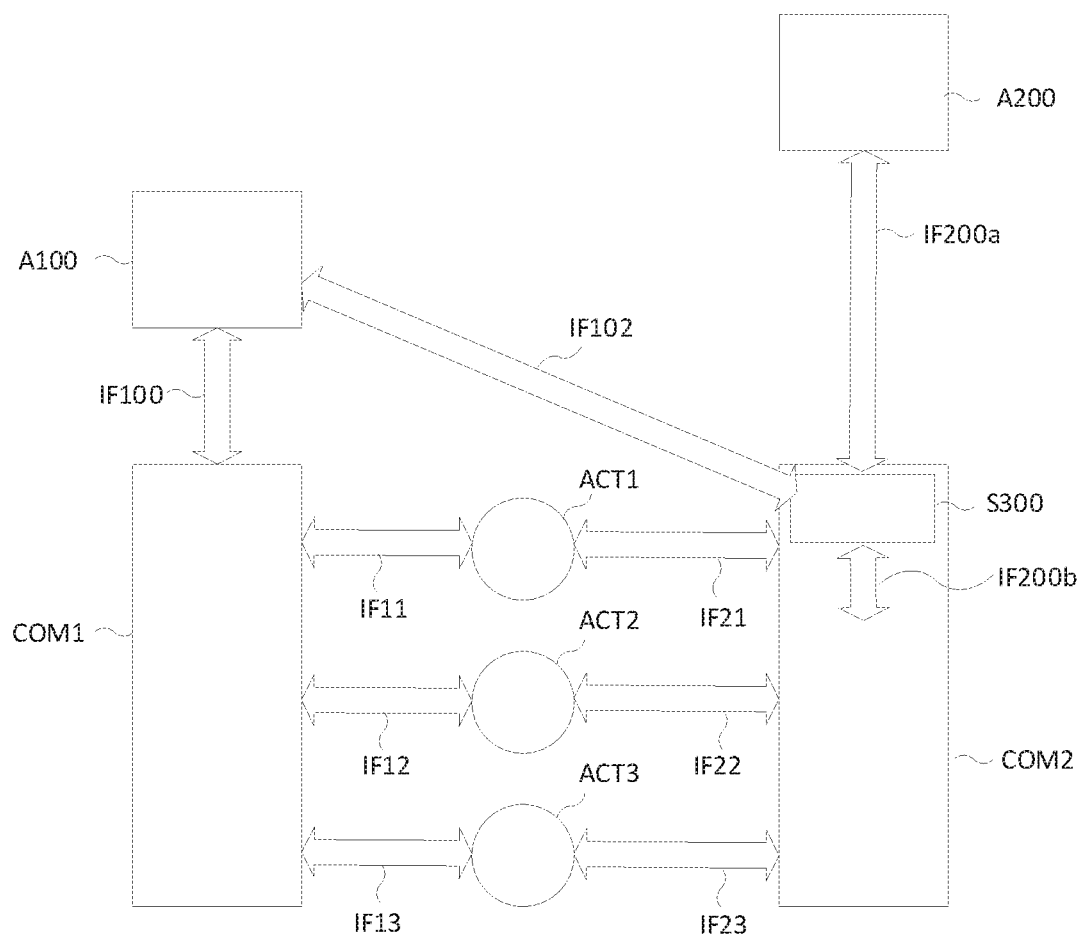
FIG. 12 depicts an example realization of the invention. In this case, the fail-over device S300 is part of the communication system COM2, and the interface IF200b is an internal interface in the communication system COM2.
Figure 13:
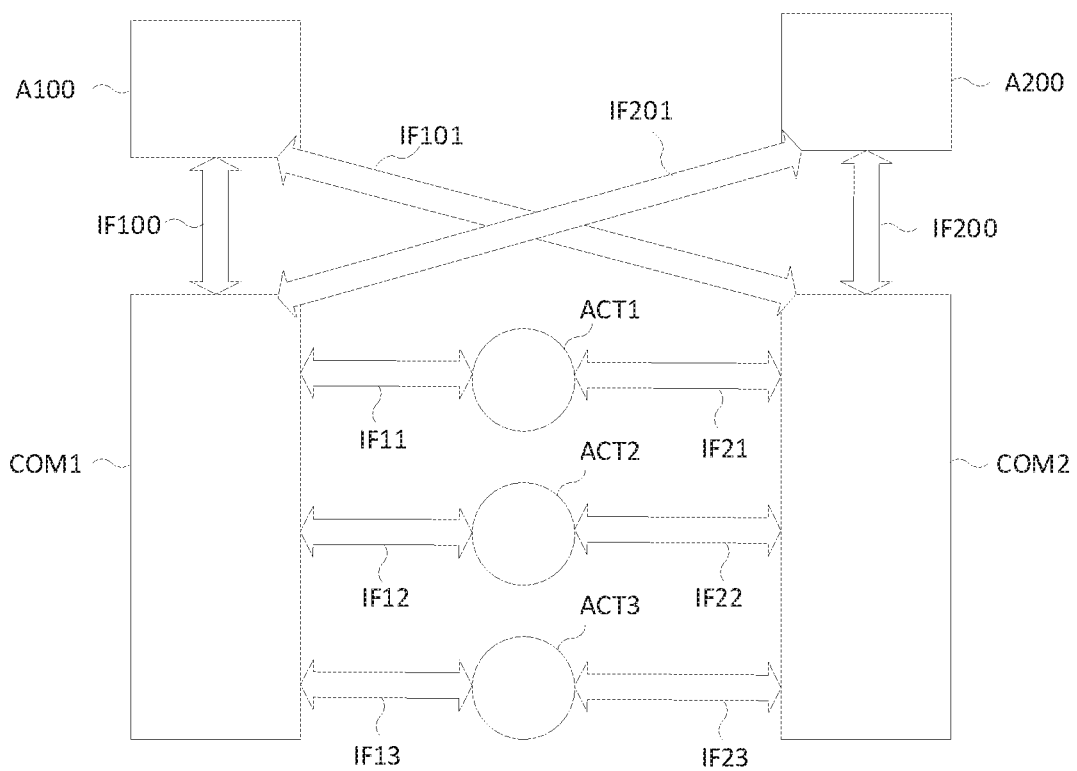
FIG. 13 depicts an example realization similar to the one presented in FIG. 5. However, in this case, node A200 is also connected to communication system COM1 and sends its control commands F-A200 also on the interface IF201 to the communication system COM1.

[1] Lamport, Leslie, Robert Shostak, and Marshall Pease. "The Byzantine generals problem." ACM Transactions on Programming Languages and Systems (TOPLAS) 4, no. 3 (1982): 382-401.

The invention claimed is:

1. A method for transmitting control commands (F-A100, F-A200) in a computer system, wherein said computer system comprises components comprising nodes (A100, A200), actuators (ACT1, ACT2, ACT3) and communication systems (COM1, COM2), wherein said control commands (F-A100, F-A200) are communicated over said communication systems (COM1, COM2) from said nodes (A100, A200) to said actuators (ACT1, ACT2, ACT3), and wherein one, two, or more components (A100, A200, IF100, IF200, COM1, COM2, IF11, IF12, IF13, IF21, IF22, IF23, ACT1, ACT2, AT3) of the computer system can fail to operate according their specification, the method comprising:

consistently accepting control commands (F-A100, F-A200) at said actuators (ACT1, ACT2, ACT3) by:
assigning priorities to nodes (A100, A200) and their control commands (F-A100, F-A200), wherein a node and its control commands have the same priority, wherein at least two priorities (HIGH, LOW) are used, wherein a high priority node (A100) produces high priority control commands (F-A100) and a low priority node (A200) produces low priority control commands (F-A200),
wherein the high priority node (A100) is configured to communicate its control commands (F-A100) over at least two communication systems (COM1, COM2) to the actuators (ACT1, ACT2, ACT3) and the low priority node (A200) is configured to communicate its low priority control commands (F-A200) over at least one communication system (COM2) to the actuators (ACT1, ACT2, ACT3),
wherein the actuator (ACT1, ACT2, ACT3) (a) accepts the high priority control commands (F-A100) from the high priority node (A100) as long as the actuator receives said high priority control commands (F-A100) on any one of the at least two communication systems (COM1, COM2) and in this first case discards the low priority control commands (F-A200) and (b) stops accepting said high priority control commands (F-A100) in case said actuator (ACT1, ACT2, ACT3) does not receive said high priority control commands (F-A100) from any communication system (COM1, COM2) of the at least two communication systems (COM1, COM2) for a configurable duration, and in which second case the actuator (ACT1, ACT2, ACT3), starts to accept low priority control commands (F-A200), wherein a fail-over device (S300) is provided which decides whether or not control commands (F-A200) from a low priority node (A200) are forwarded on a communication system (COM2), wherein a decision of the fail-over device, whether or not control commands (F-A200) from a low priority node (A200) are forwarded on a communication system (COM2), depends on the fail-over device (S300) receiving control commands (F-A100) from the high priority node (A100), wherein the fail-over device (S300) starts forwarding control commands (F-A200) from the low priority node (A200) on the communication system (COM2) when any one or any combination of the following conditions is/are met:
(i) the fail-over device (S300) does not receive control commands (F-A100) from the high priority node (A100) for the configurable duration,
(ii) the fail-over device (S300) receives more control commands (F-A100) from the high priority node (A100) than it is configured to receive, and
(iii) the fail-over device (S300) receives faulty control commands (F-A100) from the high priority node (A100), and wherein said configurable duration is longer than the maximum duration in between the production of two succeeding control commands (F-A100).

2. The method according to claim 1, wherein the computer system comprises exactly two nodes (A100, A200) which produce control commands (F-A100, F-A200), wherein the high priority node (A100) of said two nodes communicates on exactly two communication systems (COM1, COM2), and wherein the low priority node (A200) of said two nodes communicates on exactly one communication system (COM2).

3. The method according to claim 1, wherein said fail-over device (S300) only forwards a configurable number of control commands (F-A100) per configurable time-duration it receives from the high-priority node (A100) on the communication system (COM2) when it starts forwarding control commands (F-A200) from the low-priority node (A200) to said communication system (COM2), and wherein said configurable number comprises 0, 1, 2, or any integer number.

4. The method according to claim 1,
wherein the fail-over device (S300) maintains two states (ACTIVE, BACKUP), where in one of the states (ACTIVE) the fail-over device (S300) is configured not to forward control commands (F-A200) from said low priority node (A200) to said communication system (COM2), and wherein said fail-over device (S300) in the second state (BACKUP) is configured to forward control commands (F-A200) from said low priority node (A200) to said communication system.

5. The method according to claim 4, wherein the fail-said device is configured to change from said first state (ACTIVE) to said second state (BACKUP) when any one or any combination of the following conditions is/are met:
(i) the fail-over device (S300) does not receive control commands (F-A100) from the high priority node (A100) for the configurable duration,
(ii) the fail-over device (S300) receives more control commands (F-A100) from the high priority node (A100) than it is configured to receive, and
(iii) the fail-over device (S300) receives faulty control commands (F-A100) from the high priority node (A100).

6. The method according to claim 4, wherein said fail-over device (S300) only forwards a configurable number per configurable time-duration of control commands (F-A100) it receives from the high-priority node (A100) on the communication system (COM2) when it starts forwarding control commands (F-A200) from the low-priority node (A200) to said communication system (COM2), and wherein said configurable number comprise 0, 1, 2, or any integer number.

7. The method according to claim 4, wherein said fail-over device (S300) is part of the low priority node (A200).

8. The method according to claim 4, wherein said fail-over device (S300) is part of the communication system (COM2) which at least is connected to the low priority node (A200).

9. A method for transmitting control commands (F-A100, F-A200) in a computer system, wherein said computer system comprises components comprising nodes (A100, A200), actuators (ACT1, ACT2, ACT3) and communication systems (COM1, COM2), wherein said control commands (F-A100, F-A200) are communicated over said communication systems (COM1, COM2) from said nodes (A100, A200) to said actuators (ACT1, ACT2, ACT3), and wherein one, two, or more components (A100, A200, IF100, IF200, COM1, COM2, IF11, IF12, IF13, IF21, IF22, IF23, ACT1, ACT2, AT3) of the computer system can fail to operate according their specification, the method comprising:
consistently accepting control commands (F-A100, F-A200) at said actuators (ACT1, ACT2, ACT3) by:
assigning priorities to nodes (A100, A200) and their control commands (F-A100, F-A200), wherein a node and its control commands have the same priority, wherein at least two priorities (HIGH, LOW) are used, wherein a high priority node (A100) produces high priority control commands (F-A100) and a low priority node (A200) produces low priority control commands (F-A200),
wherein the high priority node (A100) is configured to communicate its control commands (F-A100) over at least two communication systems (COM1, COM2) to the actuators (ACT1, ACT2, ACT3) and the low priority node (A200) is configured to communicate its low priority control commands (F-A200) over at least one communication system (COM2) to the actuators (ACT1, ACT2, ACT3),
wherein the actuator (ACT1, ACT2, ACT3) (i) accepts the high priority control commands (F-A100) from the high priority node (A100) as long as the actuator receives said high priority control commands (F-A100) on any one of the at least two communication systems (COM1, COM2) and in this first case discards the low priority control commands (F-A200) and (ii) stops accepting said high priority control commands (F-A100) in case said actuator (ACT1, ACT2, ACT3)

does not receive said high priority control commands (F-A100) from any communication system (COM1, COM2) of the at least two communication systems (COM1, COM2) for a configurable duration, and in which second case the actuator (ACT1, ACT2, ACT3) starts to accept low priority control commands (F-A200), wherein a fail-over device (S300) is provided which decides whether or not control commands (F-A200) from a low priority node (A200) are forwarded on a communication system (COM2), and wherein said fail-over device (S300) only forwards a configurable number of control commands (F-A100) per configurable time-duration it receives from the high-priority node (A100) on the communication system (COM2) when it starts forwarding control commands (F-A200) from the low-priority node (A200) to said communication system (COM2), and wherein said configurable number comprises 0, 1, 2, or any integer number.

* * * * *

UNITED STATES PATENT AND TRADEMARK OFFICE
CERTIFICATE OF CORRECTION

| | |
|---|---|
| PATENT NO. | : 10,663,952 B2 |
| APPLICATION NO. | : 16/186909 |
| DATED | : May 26, 2020 |
| INVENTOR(S) | : Georg Niedrist et al. |

It is certified that error appears in the above-identified patent and that said Letters Patent is hereby corrected as shown below:

On the Title Page

Item (73), Assignee:
Delete "TTTECH COMPUTERTECHNIK AG"
And Insert -- TTTECH AUTO AG --

Signed and Sealed this
Twenty-ninth Day of December, 2020

Andrei Iancu
*Director of the United States Patent and Trademark Office*